(12) United States Patent
Thrash

(10) Patent No.: US 8,713,846 B1
(45) Date of Patent: May 6, 2014

(54) REMOTE CONTROL INTERCHANGEABLE DECOY

(76) Inventor: Christopher R. Thrash, Courtland, KS (US)

( * ) Notice: Subject to any disclaimer, the term of this patent is extended or adjusted under 35 U.S.C. 154(b) by 300 days.

(21) Appl. No.: 13/032,690

(22) Filed: Feb. 23, 2011

(51) Int. Cl.
*A01M 31/06* (2006.01)
*A63H 30/04* (2006.01)
*A63H 29/22* (2006.01)

(52) U.S. Cl.
USPC .................................. 43/2; 446/456; 446/484

(58) Field of Classification Search
USPC ........ 43/2; 446/454, 456, 175, 484, 491, 269, 446/279, 281
See application file for complete search history.

(56) References Cited

U.S. PATENT DOCUMENTS

| | | | | |
|---|---|---|---|---|
| 3,303,821 A | * | 2/1967 | Harris | 119/839 |
| 5,233,780 A | * | 8/1993 | Overholt | 43/2 |
| 5,377,439 A | | 1/1995 | Roos et al. | |
| 5,765,508 A | | 6/1998 | Markowitz | |
| 6,074,271 A | * | 6/2000 | Derrah | 446/457 |
| 6,092,322 A | * | 7/2000 | Samaras | 43/2 |
| 6,408,558 B1 | | 6/2002 | Cornell, Jr. et al. | |
| 6,708,440 B2 | | 3/2004 | Summers et al. | |
| 7,288,917 B2 | * | 10/2007 | Art et al. | 446/456 |
| 7,347,761 B2 | * | 3/2008 | Rowe et al. | 446/279 |
| D589,659 S | * | 3/2009 | Semler | D30/160 |
| 7,607,961 B2 | * | 10/2009 | Lorelli et al. | 446/454 |
| 2002/0162268 A1 | | 11/2002 | Fulcher | |
| 2003/0148703 A1 | * | 8/2003 | Scott et al. | 446/456 |
| 2005/0287920 A1 | * | 12/2005 | Lucas et al. | 446/454 |
| 2006/0053675 A1 | * | 3/2006 | Lindaman | 43/2 |
| 2009/0188148 A1 | * | 7/2009 | Orris et al. | 43/3 |
| 2011/0113672 A1 | * | 5/2011 | Holmberg | 43/2 |

* cited by examiner

*Primary Examiner* — Kimberly Berona
*Assistant Examiner* — Marc Burgess
(74) *Attorney, Agent, or Firm* — Robert C. Montgomery; Montgomery Patent & Design

(57) ABSTRACT

A remote control decoy for luring game animals includes a motorized frame with wheels, a wireless remote controller, and at least one life-like decoy shell. The motorized frame is a miniature wheeled vehicle having battery-powered drive and steering motors and a mounting plate for securing the decoy. The wireless controller transmits control signals to a receiver within the motorized frame, thereby allowing a user to remotely control the movement of the decoy. In use, the user moves the decoy in order to lure prey while occupying a concealed location. The user can also selectively interchange the type of decoy being used.

15 Claims, 8 Drawing Sheets

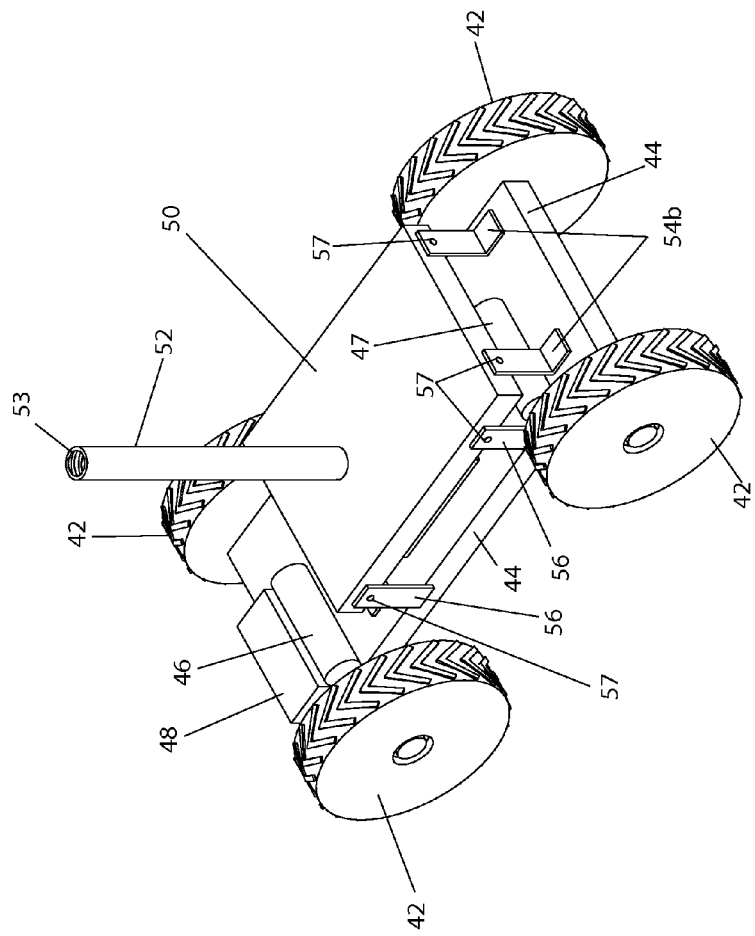

REMOTE CONTROL INTERCHANGEABLE DECOY

RELATED APPLICATIONS

The present invention was first described in a notarized Official Record of Invention on Feb. 12, 2010, that is on file at the offices of Montgomery Patent and Design, LLC, the entire disclosures of which are incorporated herein by reference.

FIELD OF THE INVENTION

The present invention relates generally to hunting decoys, and in particular, to a remote control decoy having a plurality of interchangeable decoys capable of moving across a ground surface.

BACKGROUND OF THE INVENTION

Over the years, modern advances in hunting equipment have enhanced the sport and have provided hunters with increased rates of success. The hunting decoy is one such enhancement that has become more realistic in design, easier to use, and typically provides a more successful hunting outing. However, most hunting decoys lack significant elements of realism due to their lack of movement. While many prey animals will initially respond to a hunting decoy, their artificial nature becomes obvious as the game moves closer. The unnatural characteristics of many decoys can cause some game to become spooked and run off. Ideally, the decoy is intended to realistically simulate the game.

There have been many attempts to improve the hunting decoy and as such the decoys have evolved in design, materials, and realism. These attempts can be seen by example in several U.S. patents. U.S. patent application Publication No. 2002/0162268 A1 issued to Fulcher discloses an animated decoy with movable and exchangeable parts intended to simulate the movement of an actual waterfowl in its natural setting. U.S. Pat. No. 5,377,439 issued to Roos et al. discloses a remote controlled floating decoy having a buoyant body and an integral water propulsion mechanism which is responsive to electrical control signals. U.S. Pat. No. 6,408,558 issued to Cornell, Jr. et al. discloses an apparatus and method for moving a decoy in a linear fashion over a track way. U.S. Pat. No. 6,708,440 issued to Summers et al. discloses a turkey decoy having a robotic frame with a multiplicity of movable frame portions which support a flexible decoy cover.

While these attempts may achieve their purported objective each suffers from one (1) or more disadvantage or deficiency related to design or utilization. Particularly, these decoy devices are limited in range and use and fail to offer the freedom to use different types of animal decoys. A more realistic decoy having a greater range of movement would tend to interest the game and draw their attention away from other elements in the environment including the hunter allowing for a greater chance of an accurate shot.

SUMMARY OF THE INVENTION

The inventor has therefore recognized the aforementioned inherent problems and lack in the art and observed that there is a need for a device where hunting decoys can be provided with realistic movement, a greater range, and a wider variation of simulated game decoy bodies. In accordance with the invention, it is an object of the present disclosure to solve these problems.

The inventor recognized these problems and has addressed this need by developing a remote controlled interchangeable decoy which allows for increased realism from hunting decoys in a manner which is quick, easy, and effective. The inventor has thus realized the advantages and benefits of providing a mounting plate capable of being mounted to a frame of a radio controlled vehicle chassis. The mounting frame includes a vertical mounting post extending upwardly from a top surface. A plurality of decoys is provided which are interchangeably attached to the mounting post. Each of the decoys having an exterior simulating a different game animal and a hollow interior which defines an inner cavity for generally covering the mounting plate. The remote control vehicle chassis is responsive to a control signal generated by user commands and transmitted by a radio controller in radio communication with the remote control vehicle chassis for moving the decoy apparatus across a ground surface.

In accordance with the invention, one embodiment includes the motorized manipulation assembly having a plurality of upwardly projecting brackets affixed generally around a perimeter of the frame. Each of the brackets has a bracket fastener aperture and the mounting plate has a plurality of post connectors protruding outwardly from peripheral vertical edges. Each of the plurality of post connectors is insertingly connected within a corresponding bracket fastener aperture to securely connect the mounting plate to the frame.

In another embodiment, the apparatus includes a motorized manipulation assembly capable of moving across a ground surface, a mounting plate connected to the motorized manipulation assembly, and a vertical mounting post extending upwardly from a top surface of the mounting plate. At least one (1) decoy is removably coupled to the mounting post and also has an exterior which simulates a game animal and a hollow interior for generally covering the mounting plate. A radio controller is provides and is in radio communication with the motorized manipulation assembly to remotely control at least the speed and direction of the motorized manipulation assembly by communication of a control signal.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4a is a side perspective view of a motorized manipulation assembly 40, according to the preferred embodiment;

Figure 1:
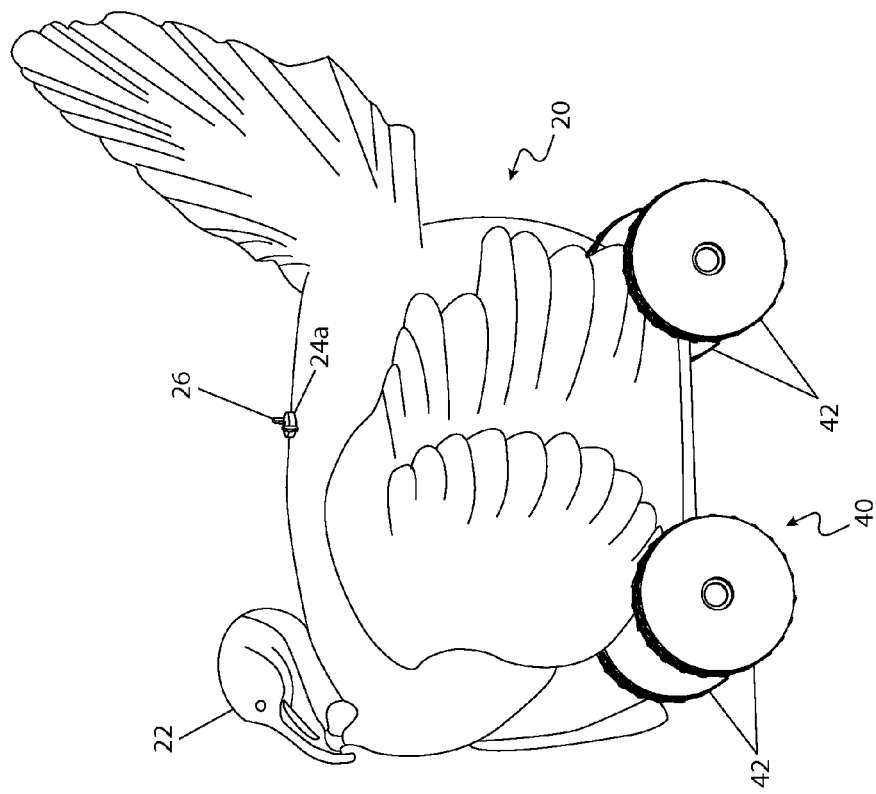
FIG. 1 is a perspective view of a remote control interchangeable decoy 10, according to a preferred embodiment in accordance with the invention.
Figure 1:
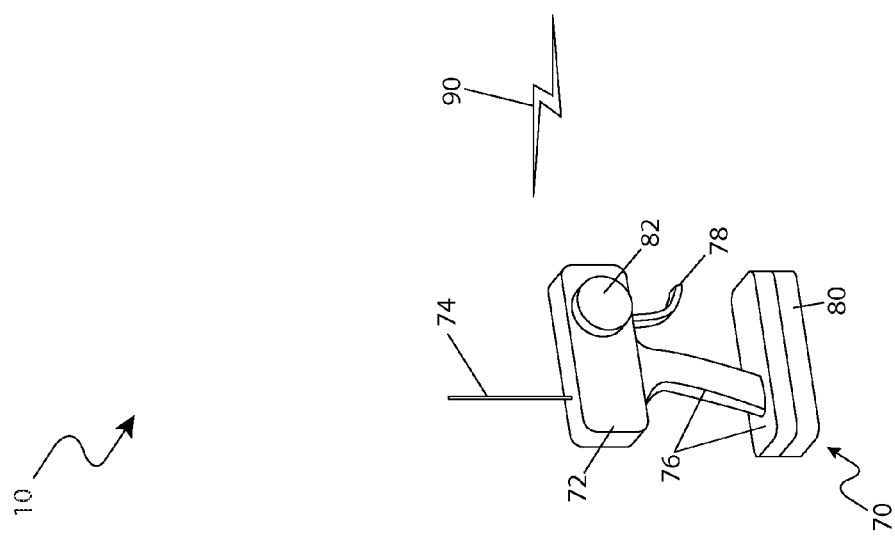

DESCRIPTIVE KEY 10 remote control interchangeable decoy
20 first decoy
22 first decoy body
24a first fastening aperture
24b second fastening aperture
26 fastening means
28 first inner cavity
32 second decoy
34 second decoy body
36 second inner cavity
40 motorized manipulation assembly
42 wheel
43 front axle
44 frame
45 rear axle
46 front drive motor
47 rear drive motor
48 steering motor
50 mounting plate
52 mounting post
53 post fastening aperture
54a front bracket
54b rear bracket
56 side bracket
57 post connector
58 pin fastener
59 post connector aperture
60 bracket fastener aperture
61 motor control enclosure
62 battery compartment cover
63 motor battery
64 hasp
65 control module
66 radio frequency (RF) receiver
67 wiring
70 remote RF controller
72 controller body
74 antenna
76 handle
78 throttle trigger
80 controller battery
82 directional control knob
90 RF signal

DETAILED DESCRIPTION OF THE PREFERRED EMBODIMENT

In accordance with the invention, the best mode is presented in terms of a preferred embodiment, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIG. 1, a perspective view of the remote control interchangeable decoy (herein described as an "apparatus") 10. The apparatus 10 provides assistance to a hunter in luring game while engaged in a hunting or animal observation activity. The apparatus 10 includes a first decoy 20 which is mounted upon a motorized manipulation assembly 40 and selectively motioned by a user using a remote RF controller 70. In use, the first decoy 20 may be motioned while a user remains hidden in a concealed location in order to effective lure prey. The user can also selectively exchange the first decoy 20 for one (1) or more second decoys 32.

Figure 2:
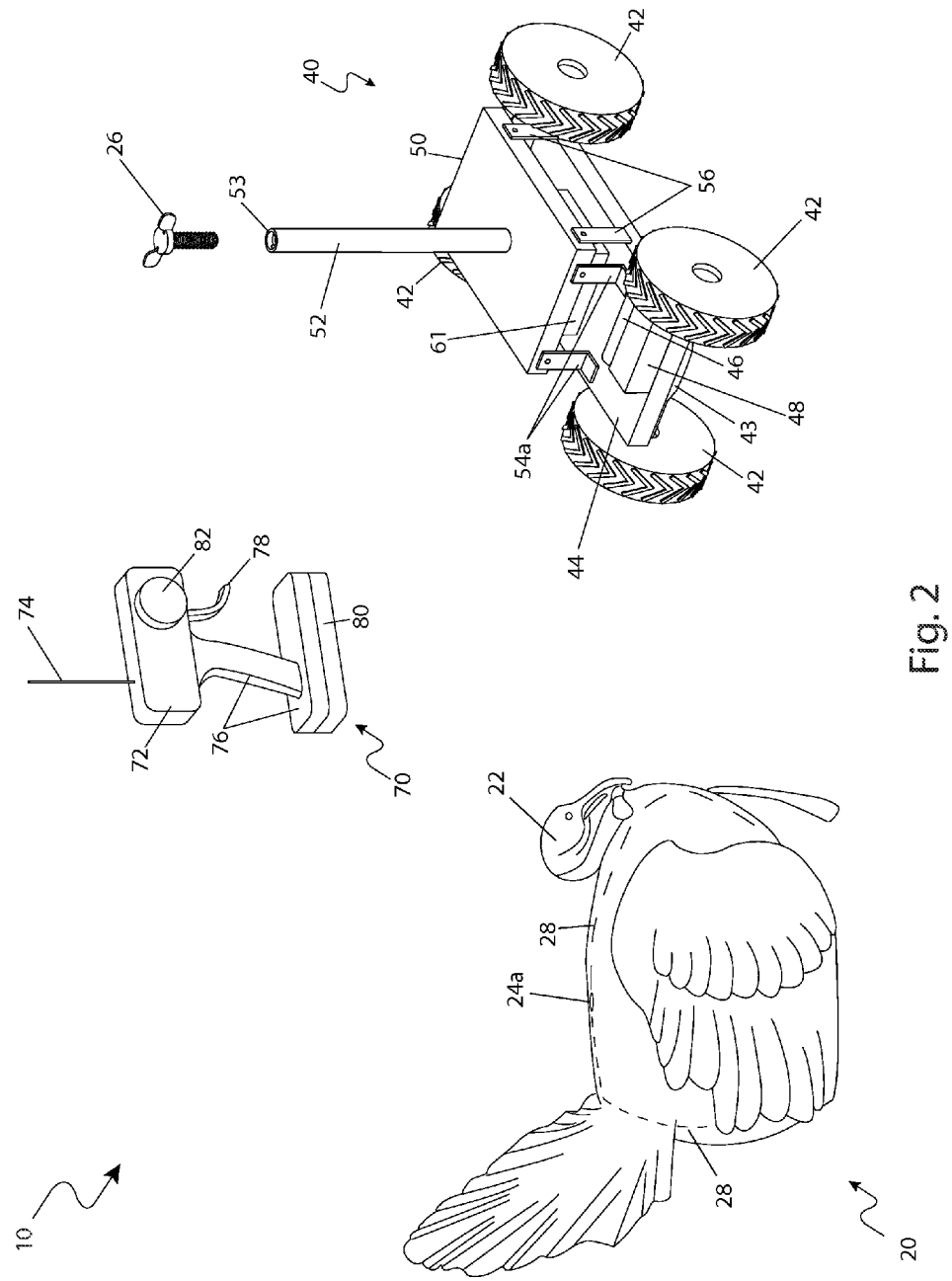
FIG. 2 is a partially exploded view of the remote control interchangeable decoy 10, according to the preferred embodiment.

Referring now to FIG. 2, a partially exploded view of the apparatus 10 is disclosed. The apparatus 10 is illustrated here depicting detachment of the first decoy 20 from the motorized manipulation assembly 40. The motorized manipulation assembly 40 provides for the attachment of the first decoy 20 by a removably attachable upper mounting plate 50 and a cylindrical mounting post 52. The mounting plate 50 includes a flat, rectangular support surface approximately six (6) inches in width and ten (10) inches in length having the integrally joined cylindrical mounting post 52. The mounting post 52 is approximately eight (8) inches in height and extends perpendicularly upward from a top surface of the mounting plate 50 from a point slightly forward of center. When attaching the first decoy 20, the mounting post 52 of the mounting plate 50 protrudes upwardly within a first inner cavity 28 of the first decoy 20 and makes contact with and subjacently supports a top inner surface of the first decoy 20. The first decoy 20 is in turn secured to the mounting post 52 using a fastener 26 such as a winged thumb screw having an integral washer feature or similar mechanical fasteners. The fastener 26 is inserted through a first fastening aperture 24a of the first decoy 20 and subsequently threadingly engaged into a second fastening aperture 53 located along a top surface of the mounting post 52 (see FIG. 3a). A lower portion of the first decoy 20 is preferably supported upon the mounting plate 50, thereby concealing the mounting plate 50 and portions of the motorized manipulation assembly 40 (see FIG. 1).

The apparatus 10 includes a hand-held remote RF controller 70 envisioned to include a conventional commercially-available battery-powered unit similar to those used to control various RF toys such as RF cars, RF airplanes, RF boats, and the like. The remote RF controller 70 preferably includes expected features such as, but not limited to: a plastic molded controller body 72, an internal or external RF transmitting antenna 74 (external type shown here), a grasping handle 76, a potentiometer-type throttle trigger 78, at least one (1) rechargeable or disposable battery 80, and a directional control knob 82. The remote RF controller 70 provides wireless transmission of RF signals 90 to a RF receiver 66 of the motorized manipulation assembly 40 which provides throttle and directional steering data in a conventional manner to control the movement of the apparatus 10. The RF signals 90 are preferably a one-way signal transmission and do not provide for duplex communication or confirmation of a received RF signal 90. The RF signal 90 is preferably of a frequency modulated (FM) signal on a frequency authorized for such use; however, other methods of modulation such as amplitude modulation, single side band, digital, continuous wave and the like would work equally well, and as such, should not be interpreted as a limiting factor of the present invention 10.

Figure 3A:
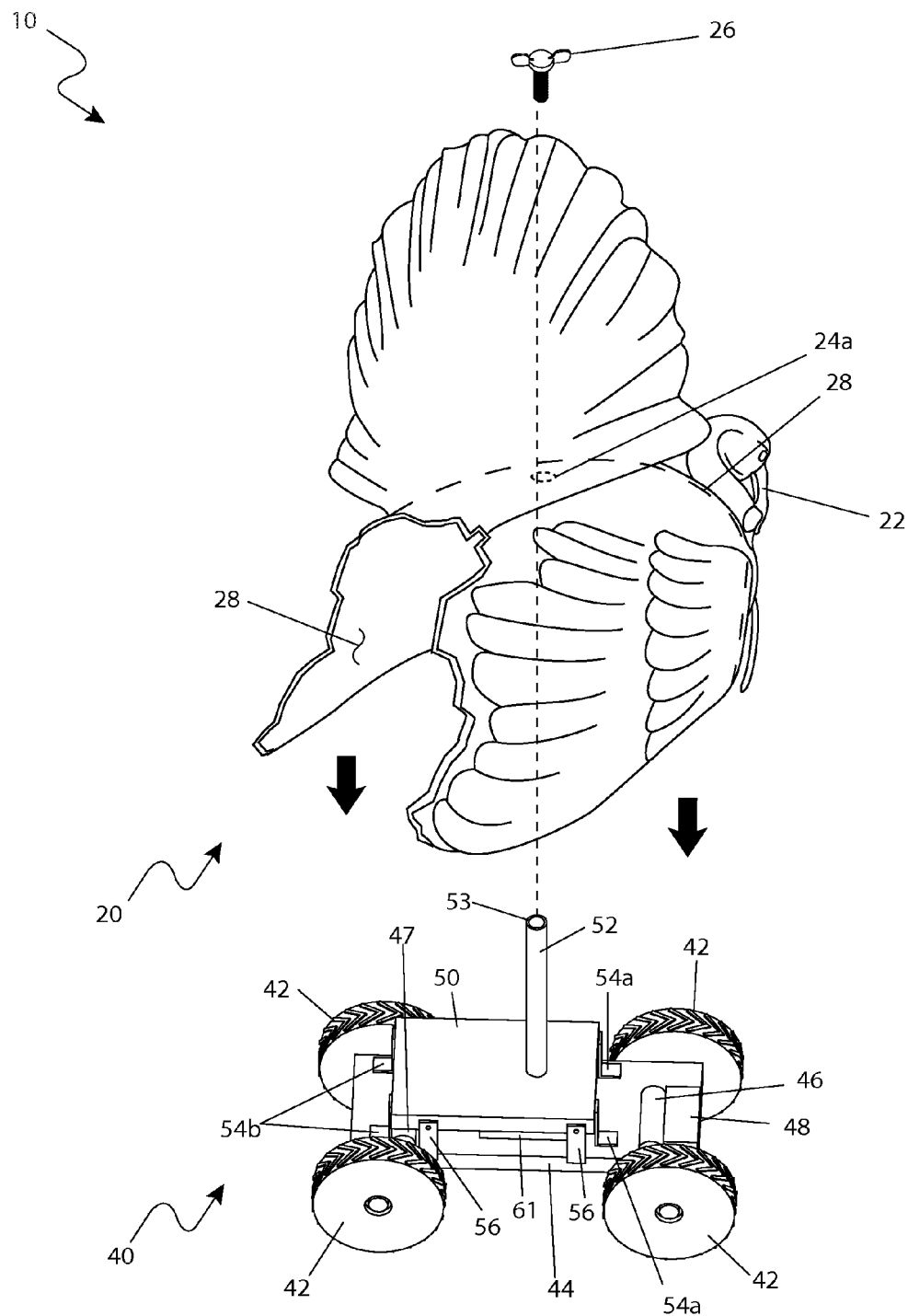
FIG. 3a is a partially exploded view of the remote control interchangeable decoy 10 depicting a first decoy 20 simulating a turkey, according to the preferred embodiment.
Figure 3B:
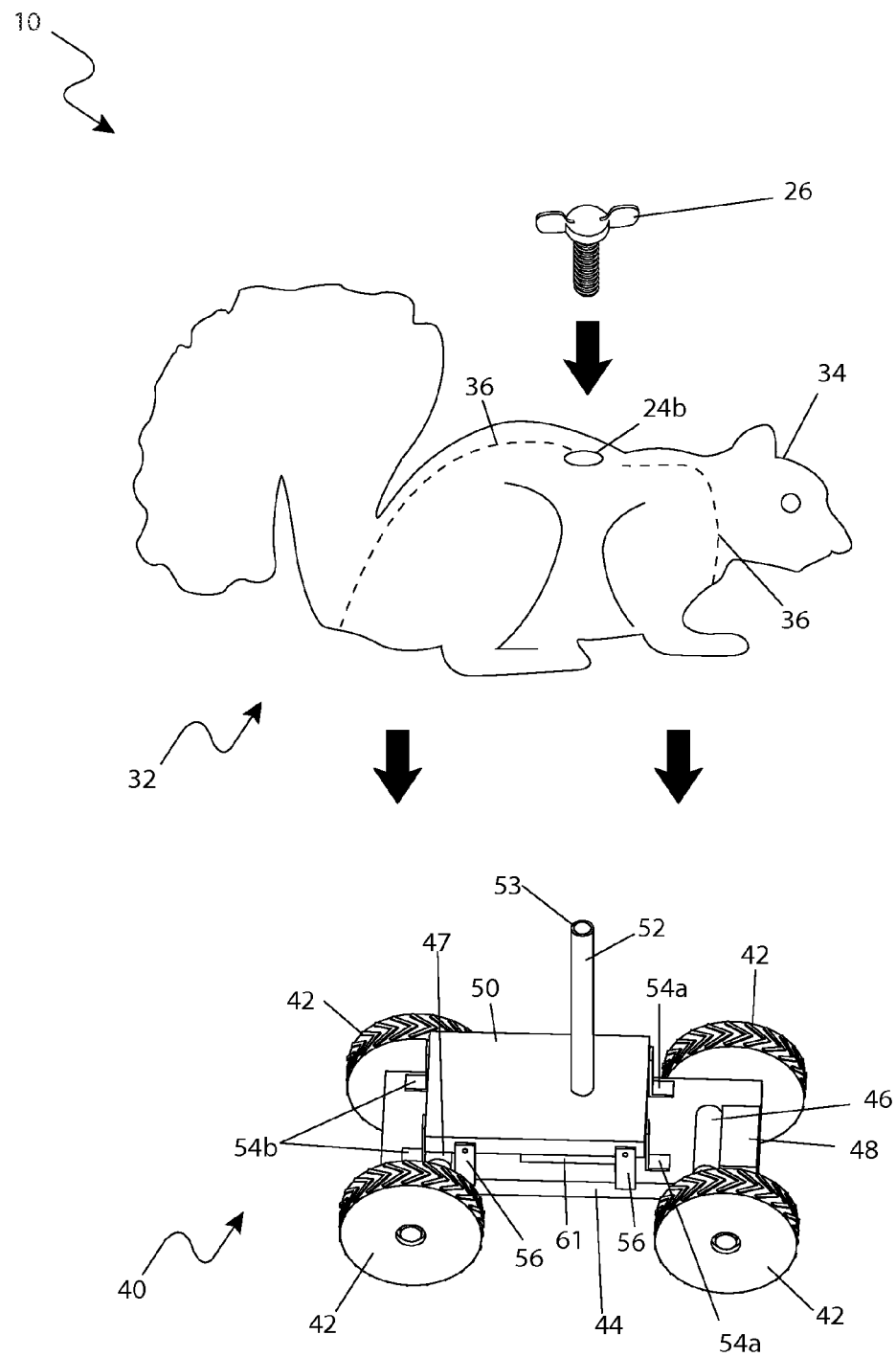
FIG. 3b is a partially exploded view of the remote control interchangeable decoy 10 depicting an alternate second decoy 32 simulating a squirrel, according to an alternate embodiment in accordance with the invention.

Referring now to FIGS. 3a and 3b, partially exploded views of the apparatus 10 depicting the first decoy 20 and second decoy 32, respectively, are disclosed. The first decoy body 22 is in a form of a wild turkey and the second decoy body 34 is in a form of a squirrel; however, the apparatus 10 is envisioned being introduced having various decoy body designs depicting various animal forms such as, but not limited to: a goose, a fox, and the like, also being useful for luring corresponding game animals and birds, and as such should not be interpreted as a limiting factor of the apparatus 10. The decoys 20, 32 include a flexible or semi-rigid hollow molded form made of plastic or rubber and including a respective first inner cavity 28, shown in FIG. 3a as being partially cut away for illustration, and a second inner cavity 36 which generally correspond to an exterior shape of the decoys 20, 32. The decoys 20, 32 also include a first fastening aperture 24a and a second fastening aperture 24b, respectively, along a top surface to provide engagement and fastening of the decoys 20, 32 to the post fastening aperture 53 of the mounting post 52. The decoys 20, 32 are envisioned to have life-like colors and patterns being either molded-into or painted upon external surfaces, thereby accurately depicting a luring animal form.

Figure 4B:
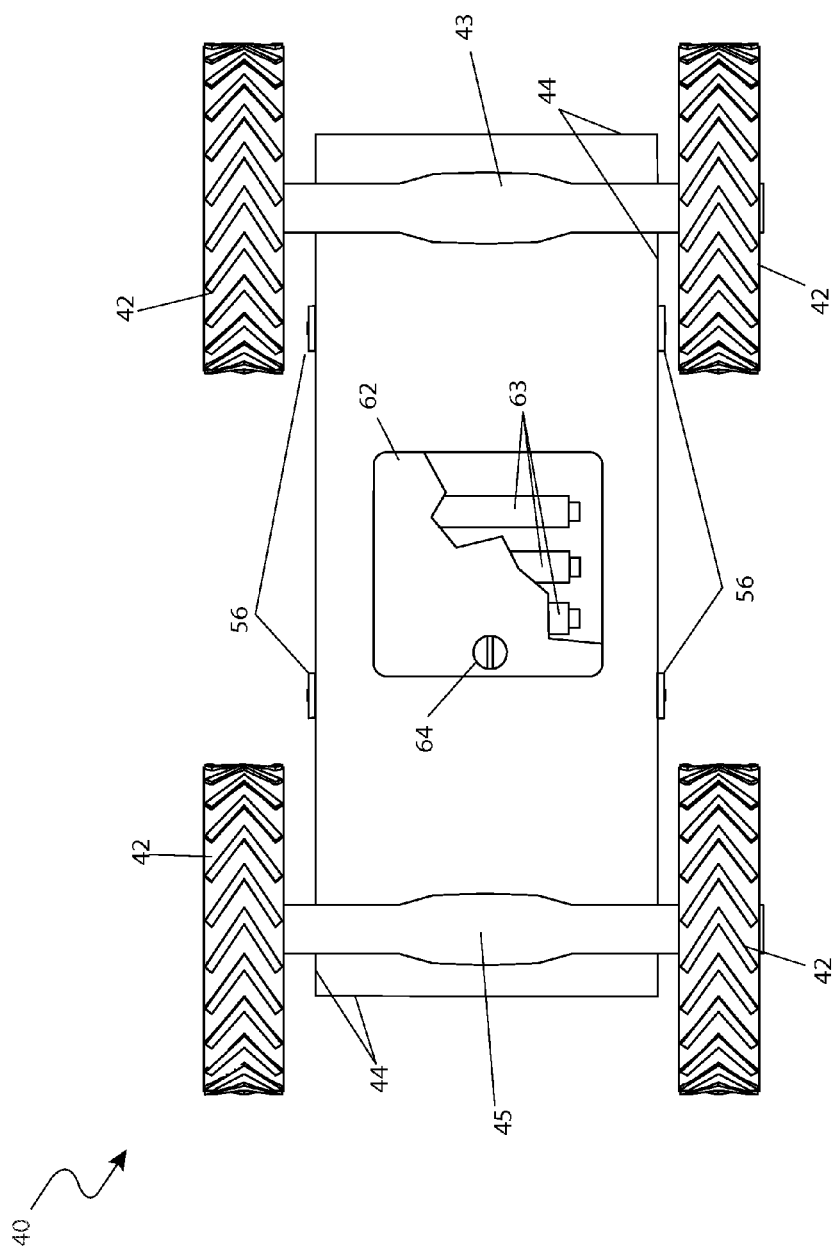
FIG. 4b is a bottom view of the motorized manipulation assembly 40, according to the preferred embodiment.

Referring now to FIGS. 4a and 4b, side and bottom views of the motorized manipulation assembly 40 are disclosed. The motorized manipulation assembly 40 includes a miniature battery-powered 63 wheeled vehicle similar in structure and function as motion mechanisms of conventional RF car-type toys common in the industry. Furthermore, it is envisioned that other styles, configurations, and arrangements of the components of the motorized manipulation assembly 40 may vary and that the particular configuration of the motorized manipulation assembly 40 as illustrated, is shown and described for purposes of clarity and disclosure and not by way of limitation of scope.

The motorized manipulation assembly 40 preferably includes four (4) treaded tires 42 approximately four (4) inches in diameter and positioned at outer corner positions in a conventional manner. The motorized manipulation assembly 40 further includes a frame 44 which provides for the attachment of a front axle 43 along a forward end which is in mechanical communication with a front drive motor 46 and a steering motor 48 to propel and steer a forwardly positioned pair of tires 42. The frame 44 also provides for the attachment of a rear axle 45 along a rearward end which is in mechanical communication with a rear drive motor 47 to propel a pair of rearwardly attached wheels 42. The frame 44 is illustrated including a flat rectangular-shaped horizontal structure extending between the four (4) wheels 42, thereby providing a rigid plastic or metal surface onto which all major components of the motorized manipulation assembly 40 are attached; however, it is understood that the frame 44 is not limited to a particular design as depicted here, and may be provided having various shapes, appendages, and functional features, while still providing equal benefit to a user without deviating from the concept, and as such should not be interpreted as a limiting factor of the apparatus 10.

The frame 44 also provides for removable attachment of the mounting plate 50 by a plurality of integral and vertically extending brackets 54a, 54b, 56. The brackets include two (2) "L"-shaped front brackets 54a, two (2) "L"-shaped rear brackets 54b, and four (4) side brackets 56. The brackets 54a, 54b, 56 releasably attach the mounting plate 50 to the frame 44. The mounting plate 50 includes a plurality of post connectors 57 protruding outwardly from and each bracket 54a, 54b, 56 includes a bracket fastener aperture 60. The mounting plate 50 is positioned above the frame 44 and in a horizontal position relative to the frame 44. A gap is provided between the frame 44 and mounting plate 50 suitable to facilitate a centrally located rectangular motor control enclosure 61 molded into and protruding upwardly from a top surface of the frame 44.

The motor control enclosure 61 includes a protective plastic or metal housing structure containing electrical and electronic equipment necessary for the operation of the motorized manipulation assembly 40 including major components such as, but not limited to: a control circuit board 65, an RF receiver 66, at least one battery 63, motor controlling software, microprocessors, relays, and the like. Access to the batteries 63 secured within the motor control enclosure 61 is provided by a battery compartment cover 62 and corresponding hasp 64 located along a bottom surface of the frame 44.

Figure 5:
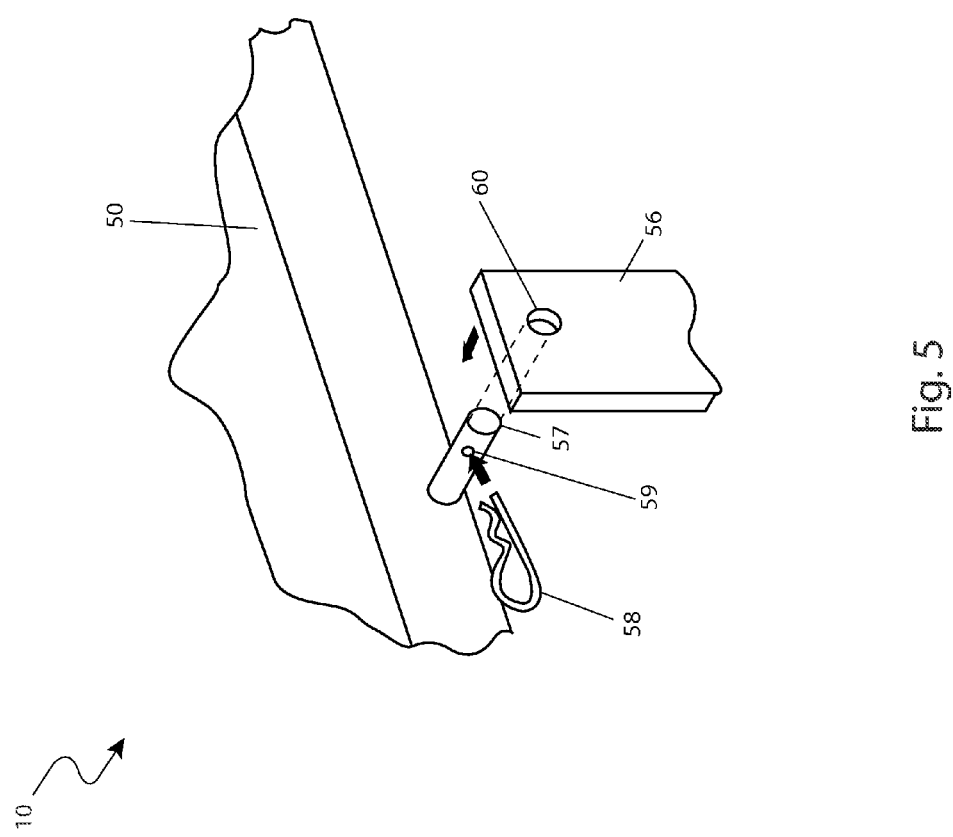
FIG. 5 is a close-up view of a post connector 57, according to the preferred embodiment; and, FIG. 6 is an electrical block diagram depicting the major electrical components of the remote control interchangeable decoy 10, according to the preferred embodiment.

Referring now to FIG. 5, a close-up view of a single post connector 57 located along a side surface of the mounting plate 50 is disclosed. The mounting plate 50 is removably attached to the frame 44 by the mechanical coupling of respective post connectors 57 and correspondingly positioned bracket apertures 60. A single side bracket 56 and post connector 57 are shown here for illustration and clarity. Each post connector 57 forms a generally cylindrical appendage which extends horizontally outward from front, back, and side vertical surfaces of the mounting plate 50. The post connectors 57 insertingly attach a corresponding one of the brackets 54a, 54b, 56 through the integral bracket fastener apertures 60. The post connectors 57 are secured in position by a pin fastener 58 such as a bridge pin, cotter pin, or the like, being inserted through a post connector aperture 59 of each post connector 57. The removable function of the mounting plate 50 allows a user to quickly exchange between multiple mounting plates 50 having been previously configured with various style decoys 20, 32, thereby saving time while preparing the apparatus 10 for a hunting or animal observation activity.

Figure 6:
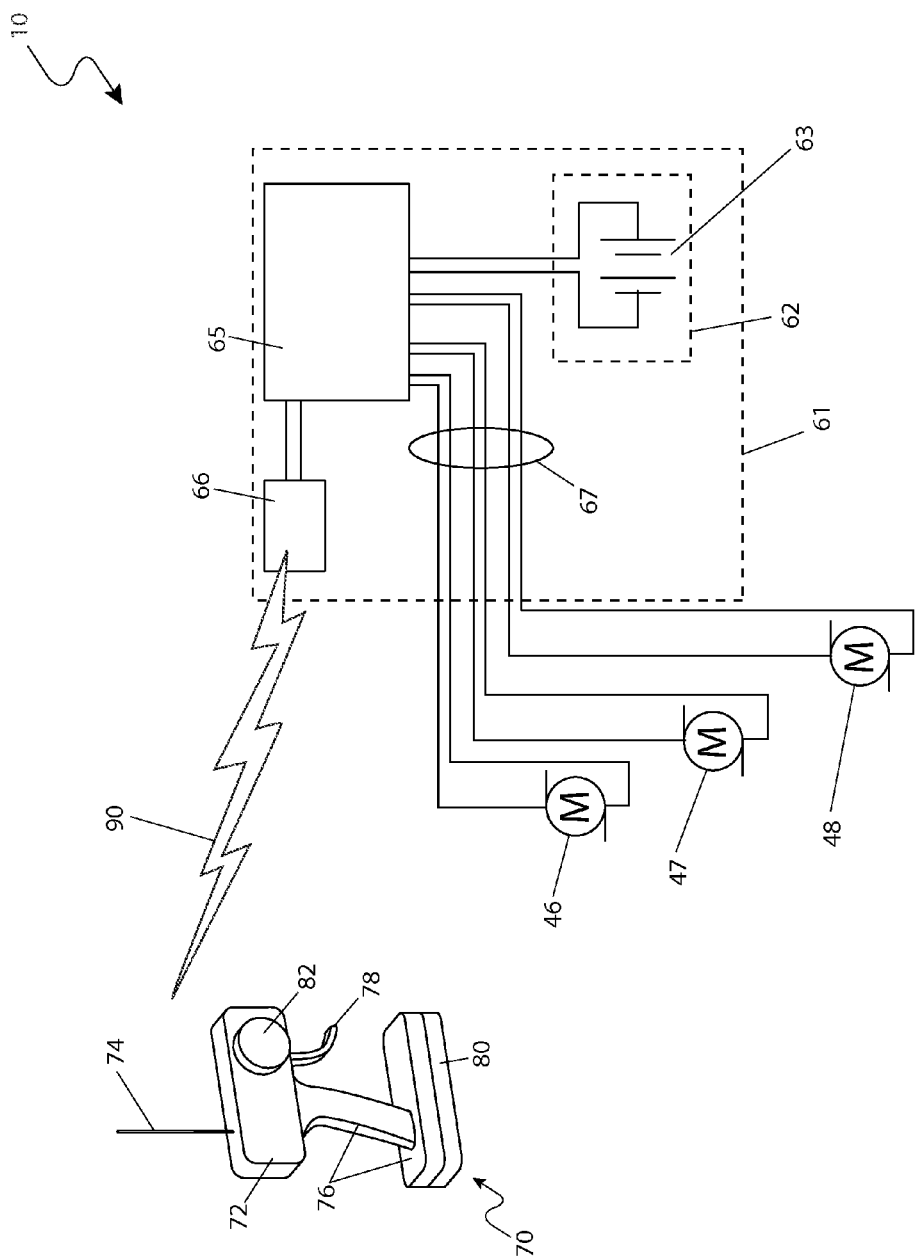

Referring now to FIG. 6, an electrical block diagram depicting the major electrical components of the apparatus 10 is disclosed. The motor control enclosure 61 is in electrical communication with a control circuit board 65, an RF receiver 66, the motor battery 63, the front drive motor 46, the rear drive motor 47, and the steering motor 48 by lengths of wiring 67 having suitable grade and gage for the application. The RF receiver 66 is in wireless communication with the remote RF controller 70 via the RF signal 90. Upon receiving the wireless signal 90 from the remote RF controller 70, resulting from a user interaction with the throttle trigger 78 or directional control knob 82, the control module 65 in turn directs a flow of electrical current from the motor battery 63 to one (1) or more motors 46, 47, 48, thereby propelling or steering the motorized manipulation assembly 40 with the attached decoy 20, 32 at an intended speed and in an intended direction by operational software and hardware within the control module 65.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed and utilized as indicated in FIGS. 1 through 5.

The method of installing and utilizing the apparatus 10 may be achieved by performing the following steps: procuring a model of the apparatus 10 having a desired decoy or decoys 20, 32 which depict a desired luring animal form; loading a fresh or recharged set of motor batteries 63 and controller batteries 80; assembling the decoy 20, 32 to the motorized manipulation assembly 40 by inserting the mounting post 52 within the decoy cavity 28, 36 and fastening the decoy 20, 32 in place using the fastening means 26, if not previously assembled; placing the assembled decoy 20, 32 and motorized manipulation assembly 40 portions at a location deemed suitable for luring game such as in a field, in a wooded area, or the like; manipulating the apparatus 10 along a ground surface while occupying a remote location using the hand-held remote RF controller 70, so as to emulate a live game animal; motioning the decoy 20, 32 using the throttle trigger 78 and directional control knob 82 portions of the remote RF controller 70; operating the apparatus 10 for a period of time to lure a desired game animal into shooting or observation range; and, benefiting from an enhanced hunting or game observation experience afforded a user of the present invention 10.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. A remote control decoy apparatus comprising:
    a motorized manipulation assembly comprising a chassis frame, a plurality of wheel assemblies capable of moving across a ground surface, and a drive mechanism mechanically coupled to said wheel assemblies, said frame comprising a substantially planar top surface and a substantially planar bottom surface;
    a plurality of upwardly projecting brackets affixed to said frame proximate a perimeter of said top surface;
    a mounting plate spaced apart from said frame, said mounting plate comprising a plurality of outwardly projecting post connectors disposed around a perimeter thereof, each post connector of said plurality of post connectors being removably connected to a correspondingly positioned bracket of said plurality of brackets, said plurality of brackets defining a gap between said frame and said mounting plate, said drive mechanism being disposed within said gap between said frame and said mounting plate;
    a vertical mounting post extending upwardly from a top surface of said mounting plate;
    at least one decoy removably coupled to said mounting post, said decoy having an exterior simulating a game animal, said decoy defining a hollow interior and an opening into said hollow interior disposed in a lower end to receive said mounting plate and said drive mechanism; and,
    a radio controller in radio communication with said motorized manipulation assembly capable of remotely controlling at least speed and direction of said motorized manipulation assembly by communication of a control signal.

2. The apparatus of claim 1, wherein said plurality of wheel assemblies are rotatably coupled to said frame and responsive to said control signal.

3. The apparatus of claim 2,
    wherein said mounting plate is removably connected to said plurality of brackets parallel to said top surface.

4. The apparatus of claim 3, wherein said decoy further comprises a decoy fastening aperture disposed in an upper end; and,
    wherein said mounting post further comprises a post fastening aperture having an internal thread which is aligned with said decoy fastening aperture to threadingly receive a fastener that secures said decoy to said mounting post.

5. The apparatus of claim 4, wherein each bracket of said plurality of brackets comprises a bracket fastener aperture proximate an upper end thereof;
    wherein said post connector protrudes outwardly from peripheral vertical edges of said mounting plate; and,
    wherein said post connector is insertingly connected within said bracket fastener aperture of said correspondingly positioned bracket to removably connect said mounting plate to said frame in a spaced apart relationship defining said gap.

6. The apparatus of claim 5, wherein said motorized manipulation assembly further comprises:
    a radio receiver capable of receiving said control signal;
    a control module coupled to said frame and in electrical communication with said radio receiver capable of interpreting said control signal;
    a power supply capable of powering said motorized manipulation assembly;
    wherein said drive mechanism is electrically coupled to said control module and is responsive to speed and direction commands from said control module to control rotation and direction of at least two wheel assemblies of said plurality of wheel assemblies.

7. The apparatus of claim 6, wherein said drive mechanism further comprises:
    a front axle mounted to said frame, wherein a front two wheel assemblies of said plurality of wheel assemblies are mechanically connected to opposing ends of said front axle;
    at least one front drive motor having a shaft in mechanical communication with said front axle, wherein rotation of said front drive motor shaft translates into rotation of said two wheel assemblies; and,
    at least one steering servomotor in mechanical communication with a steering linkage, wherein actuation of said steering servomotor moves said steering linkage to change direction of said front two wheel assemblies.

8. The apparatus of claim 7, wherein said radio controller further comprises:
    a controller body having a handle;
    a throttle control mechanism being responsive to user generated speed commands;
    a directional control mechanism being responsive to user generated directional commands;
    a radio frequency transmitter in electrical communication with said throttle control mechanism and said directional control mechanism capable of generating said control signal in response to said user generated speed commands and user generated directional commands; and,
    a power supply capable of powering said radio controller.

9. The apparatus of claim 8, wherein said drive mechanism further comprises:

a rear axle mounted to said frame, wherein a rear two wheel assemblies of said plurality of wheel assemblies are mechanically connected to opposing ends of said rear axle; and, at least one rear drive motor having a shaft in mechanical communication with said rear axle, wherein rotation of said rear drive motor shaft translates into rotation of said rear two wheel assemblies.

10. The apparatus of claim 9, wherein said mounting post is disposed upon said mounting plate in a forward of a center position.

11. A remote control decoy apparatus comprising:
a chassis frame comprising a substantially planar top surface and a substantially planar bottom surface;
a plurality of upwardly projecting brackets affixed to said frame around a perimeter of said top surface;
a mounting plate removably connected to said plurality of brackets, said mounting plate comprising a plurality of outwardly projecting post connectors disposed around a perimeter thereof, each post connector of said plurality of post connectors being removably connected to a correspondingly positioned bracket of said plurality of brackets, said plurality of brackets being removably connected to said plurality of post connectors at a front edge, a rear edge, and opposing side edges of said mounting plate such that a gap is defined between said frame and said mounting plate;
a front axle mounted to said frame;
two front wheel assemblies mechanically connected to opposing ends of said front axle;
at least one front drive motor disposed within said gap between said mounting plate and said top surface of said frame, said front drive motor comprising a shaft in mechanical communication with said front axle;
at least one steering servomotor in mechanical communication with said front axle;
a rear axle mounted to said frame;
two rear wheel assemblies mechanically connected to opposing ends of said rear axle;
a vertical mounting post extending upwardly from a top surface of said mounting plate;
a plurality of decoys interchangeably attached to said mounting post, each decoy of said plurality of decoys comprising an exterior simulating a game animal defining a hollow interior and an opening into said hollow interior disposed in a lower end to receive said mounting plate and said front drive motor;

a radio frequency transmitter capable of generating a control signal in response to user generated speed commands and user generated directional commands;
a radio receiver disposed on said frame in radio communication with said radio frequency transmitter capable of receiving said control signal;
a control module disposed within said gap between said mounting plate and said top surface of said frame, said control module being capable of interpreting said control signal to control said front drive motor and said steering servomotor to move said remote control decoy apparatus across a ground surface; and,
a power supply disposed within said gap between said mounting plate and said top surface of said frame for powering said remote control decoy apparatus.

12. The apparatus of claim 11, wherein each decoy of said plurality of decoys further comprises a decoy fastening aperture disposed in an upper end; and,
wherein said mounting post further comprises a post fastening aperture having an internal thread which is aligned with said decoy fastening aperture to threadingly receive a fastener that secures said decoy to said mounting post.

13. The apparatus of claim 12, wherein each bracket of said plurality of brackets comprises a bracket fastener aperture disposed through an upper end thereof;
wherein said protrudes outwardly from front, rear, and side vertical edges of said mounting plate; and,
wherein post connector is insertingly connected within said bracket fastener aperture of said correspondingly positioned bracket to removably connect said mounting plate to said frame in a spaced apart relationship defining said gap.

14. The apparatus of claim 11, further comprising at least one rear drive motor disposed within said gap between said mounting plate and said top surface of said frame, said rear drive motor comprising a shaft in mechanical communication with said rear axle, said rear drive motor being received by said opening in said decoy;
wherein said control module is capable of controlling said rear drive motor.

15. The apparatus of claim 14, wherein said mounting post is disposed upon said mounting plate in a forward of a center position.

* * * * *